US010526771B1

(12) United States Patent
Devereaux et al.

(10) Patent No.: US 10,526,771 B1
(45) Date of Patent: Jan. 7, 2020

(54) WATER FLOW MONITORING AND LEAK DETECTION/MITIGATION SYSTEM AND METHOD

(71) Applicant: HS Labs, Inc., San Antonio, TX (US)

(72) Inventors: Ramsey Devereaux, San Antonio, TX (US); Manfred Amann, San Antonio, TX (US); Eric David Schroeder, San Antonio, TX (US); Donna Moncrief Brown, San Antonio, TX (US); Emily Margaret Gray, San Antonio, TX (US); Jess W. Gingrich, San Antonio, TX (US); Justin Dax Haslam, San Antonio, TX (US); Sharon Kay Haverlah, Bulverde, TX (US); Michael Kyne, San Antonio, TX (US); Juspreet Kaur, San Antonio, TX (US)

(73) Assignee: HS Labs, Inc., San Antonio, TX (US)

( * ) Notice: Subject to any disclaimer, the term of this patent is extended or adjusted under 35 U.S.C. 154(b) by 0 days.

(21) Appl. No.: 15/625,434

(22) Filed: Jun. 16, 2017

Related U.S. Application Data

(60) Provisional application No. 62/351,427, filed on Jun. 17, 2016, provisional application No. 62/409,266, filed on Oct. 17, 2016.

(51) Int. Cl.
*E03B 7/07* (2006.01)
*G05D 7/06* (2006.01)

(52) U.S. Cl.
CPC .......... *E03B 7/071* (2013.01); *G05D 7/0635* (2013.01); *Y10T 137/7761* (2015.04)

(58) Field of Classification Search
CPC ..... G05D 7/0623; G05D 7/0635; E03B 7/071; Y10T 137/7761
USPC ....................................................... 137/487.5
See application file for complete search history.

(56) References Cited

U.S. PATENT DOCUMENTS

| 5,056,554 | A | * | 10/1991 | White | E03B 7/12 137/312 |
|---|---|---|---|---|---|
| 5,086,806 | A | * | 2/1992 | Engler | G01F 15/003 137/486 |
| 6,963,808 | B1 | * | 11/2005 | Addink | E03B 7/071 702/45 |
| 2004/0128034 | A1 | * | 7/2004 | Lenker | G05D 7/0635 700/282 |
| 2006/0009928 | A1 | * | 1/2006 | Addink | E03B 7/071 702/50 |
| 2007/0084512 | A1 | * | 4/2007 | Tegge, Jr. | B63B 13/02 137/487.5 |

(Continued)

*Primary Examiner* — William M McCalister
(74) *Attorney, Agent, or Firm* — Pizarro Allen PC

(57) ABSTRACT

A flow monitoring system, which is configured to detect a leak in a water distribution system having appliances, includes a flow sensor. The flow sensor is configured to detect flow data of a flow of water within a conduit configured to fluidly couple to the appliances. The flow monitoring system also includes a processor. The processor is configured to receive the flow data from the flow sensor, determine whether a reference flow pattern (of a plurality of reference flow patterns) is present in the flow data (where the plurality of reference flow patterns correspond with expected water flow patterns to one or more appliance of the appliances), and initiate a shut-down mode configured to stop the flow of water in response to a determination that the reference flow pattern is not present in the flow data.

5 Claims, 12 Drawing Sheets

(56) References Cited

U.S. PATENT DOCUMENTS

| | | | | |
|---|---|---|---|---|
| 2009/0326719 | A1* | 12/2009 | Nagase | G01F 1/42 |
| | | | | 700/282 |
| 2010/0204839 | A1* | 8/2010 | Behm | E03B 7/071 |
| | | | | 700/282 |
| 2014/0230911 | A1* | 8/2014 | Hirata | G01F 25/0007 |
| | | | | 137/10 |
| 2016/0252422 | A1* | 9/2016 | Howitt | E03B 7/071 |
| | | | | 73/40.5 A |
| 2016/0335875 | A1* | 11/2016 | Alcorn | G01F 1/34 |
| 2017/0105369 | A1* | 4/2017 | Shamley | A01G 25/16 |
| 2017/0285665 | A1* | 10/2017 | Nunally | G05D 7/0635 |

* cited by examiner

| APPLIANCES | | ERROR | FLOW RANGE | |
|---|---|---|---|---|
| ○ | NO FLOW | | | |
| ○ | UNKNOW | | | |
| ○ | KITCHEN_FAUCET_REC_I | 5.9 | 5.5 | 6.6 |
| ○ | DOWNSTAIRS_TOILET_REC_I | 1.1 | 0 | 0 |
| ○ | DOWNSTAIRS_BATHROOM_FAUCET_R | 6.5 | 4.1 | 5 |
| ○ | UPSTAIRS_TOILET_REC_I | 2.6 | 2.7 | 3.2 |
| ○ | UPSTAIRS_TOILET2_REC_I | 3.9 | 1.2 | 1.4 |
| ○ | SHOWER_REC_I | 6.2 | 4.7 | 5.6 |
| ○ | UPSTAIRS_SINK_REC_I | 6.3 | 5.6 | 6.8 |
| ○ | FRIDGE_REC_I | 9 | 1.5 | 1.8 |
| ○ | BATHROOM_SINK2_REC_I | 5.3 | 5.7 | 6.9 |
| ○ | DISHWASHER_REC_II | 6.7 | 3.8 | 4.6 |

FOUND APPLIANCE ○

WATER FLOW MONITORING AND LEAK DETECTION/MITIGATION SYSTEM AND METHOD

CROSS REFERENCE TO RELATED APPLICATION

This application claims priority to and the benefit of U.S. Provisional Application No. 62/351,427, entitled "WATER FLOW MONITORING AND LEAD DETECTION SYSTEM AND METHOD," filed Jun. 17, 2016, and U.S. Provisional Application No. 62/409,266, entitled "LEAK DETECTION AND MITIGATION SYSTEM" filed Oct. 17, 2016, which are hereby incorporated by reference in their entireties for all purposes.

BACKGROUND

The present disclosure is directed generally toward water flow monitoring, and specifically toward leak detection and mitigation.

Traditional water shut-off systems are generally based on monitoring a continuous flow of water from a water source to one or more appliances requiring the use of water. However, traditional systems may be unreliable, and may include only basic functionality. For example, traditional systems may indicate a serious fault condition when only a minor leak has occurred. Further, traditional systems may be incapable of detecting fault conditions in an environment (e.g., a residential, commercial, or industrial setting) having several appliances, all of which receive a supply of water from the same water source. Further still, traditional systems intended to detect fault conditions in environments having several appliances may be unnecessarily complex, requiring the use of different sensor systems for each appliance.

BRIEF DESCRIPTION

An embodiment of the present disclosure includes a flow monitoring system configured to detect a leak in a water distribution system having appliances. The flow monitoring system includes a flow sensor configured to detect flow data of a flow of water within a conduit configured to fluidly couple to the appliances. The flow monitoring system also includes a processor. The processor is configured to receive the flow data from the flow sensor, determine whether a reference flow pattern (of a plurality of reference flow patterns) is present in the flow data (where the plurality of reference flow patterns correspond with expected water flow patterns to one or more appliance of the appliances), and initiate a shut-down mode configured to stop the flow of water in response to a determination that the reference flow pattern is not present in the flow data.

Another embodiment of the present disclosure includes a method of monitoring a flow of water in a water distribution system having a plurality of appliances. The method includes detecting, via a sensor, flow data of the flow of water toward the plurality of appliances. The method also includes determining, via a processor, whether a reference flow signature of a plurality of reference flow signatures is present in the flow data. Each reference flow signature of the plurality of reference flow signatures corresponds with an expected flow to one or more appliance of the plurality of appliances. The method also includes initiating, via a controller and in response at least in part to a determination that the reference flow signature is not present in the flow data, a shut-down mode configured to stop the flow of water toward the plurality of appliances.

Another embodiment of the present disclosure includes a tangible, non-transitory, computer readable medium storing instructions thereon. The instructions are configured to cause a processor, when executed, to receive flow data of a flow of water toward a plurality of appliances arranged in a water distribution system. The instructions are also configured, when executed, to cause the processor to determine whether a reference flow pattern of a plurality of reference flow patterns is present in the flow data (where the plurality of reference flow patterns correspond with expected flows to one or more appliances of the plurality of appliances). The instructions are also configured, when executed, to cause the processor to initiate, in response at least in part to a determination that the reference flow pattern is not present in the flow data, a shut-down mode configured to stop the flow of water toward the plurality of appliances.

DRAWINGS

These and other features, aspects, and advantages of the present disclosure will become better understood when the following detailed description is read with reference to the accompanying drawings in which like characters represent like parts throughout the drawings, wherein.

Figure 12:
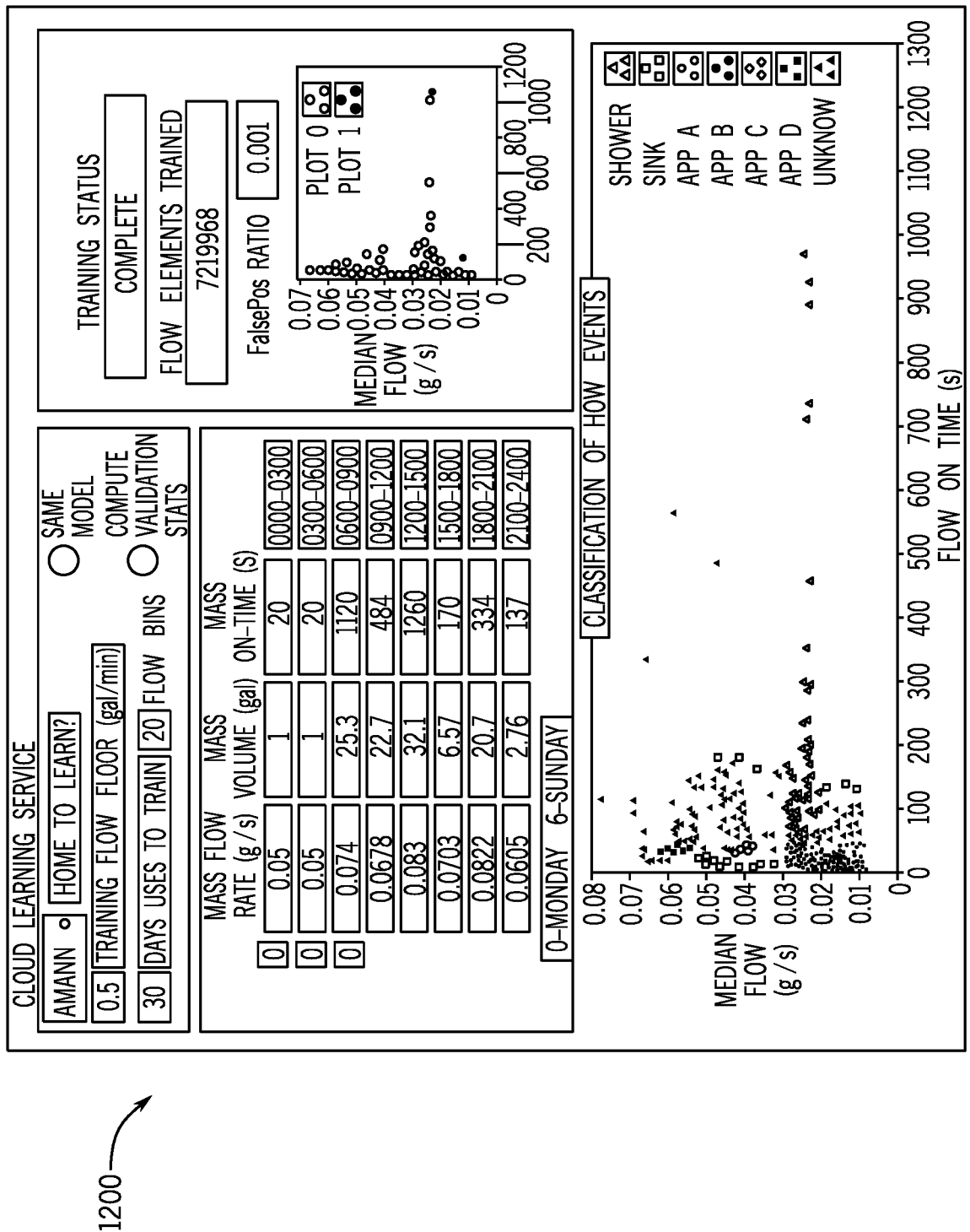
Figure 13:
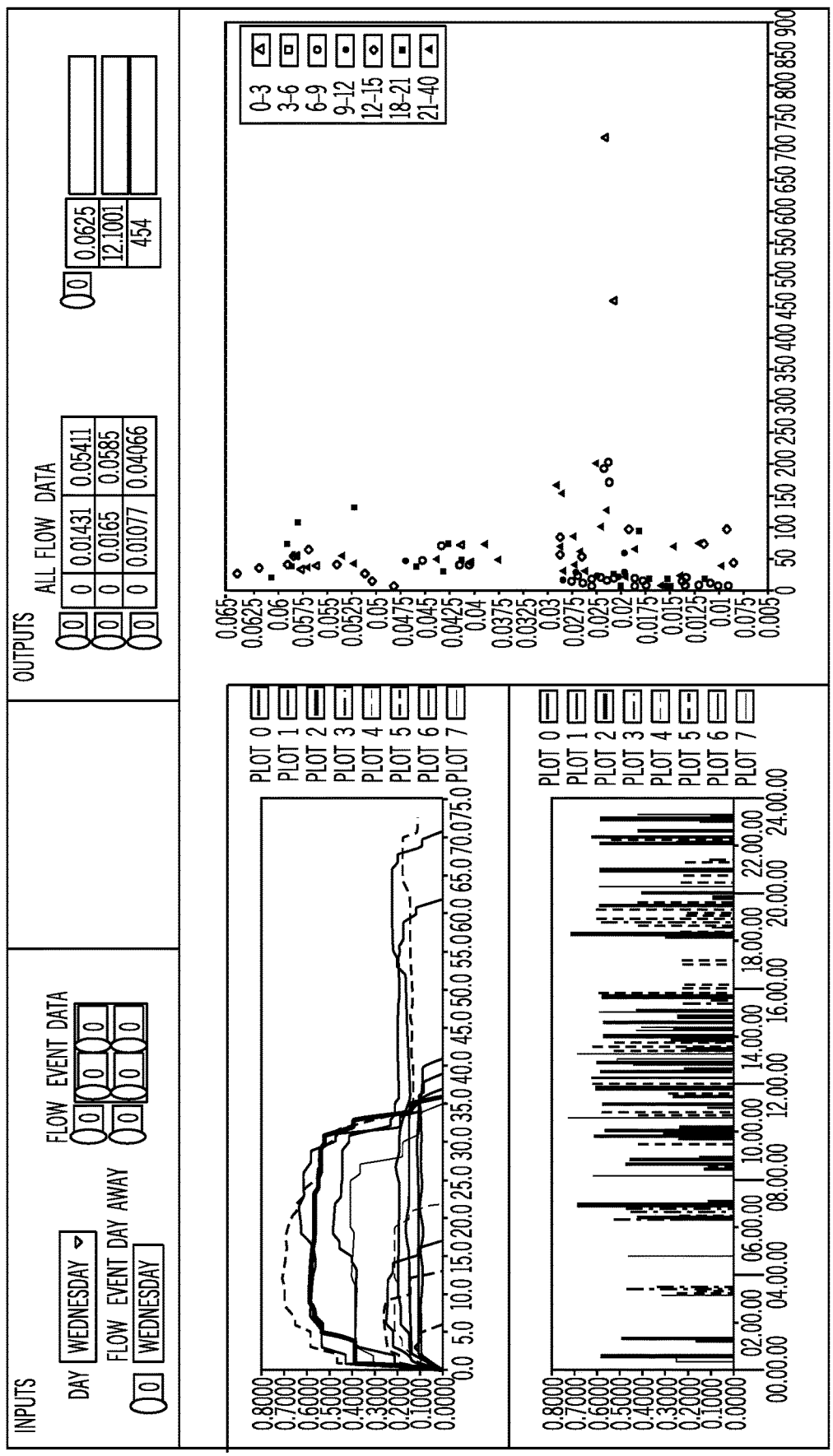

FIG. 12 is an embodiment of a user interface illustrating various features of a cloud learning system utilized for determining flow data and classifying flow events, in accordance with an aspect of the present disclosure; and FIG. 13 is an embodiment of a user interface illustrating identification and clustering of individual flow events to be learned by the cloud learning system of FIG. 12, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward a water flow monitoring system, and more specifically to leak detection/mitigation of the water flow monitoring system. It should be noted that the phrases "water flow monitoring system," "leak detection/mitigation system," and variants thereof may be used interchangeably in the description below. An embodiment of the disclosed system may include, for example, a conduit or pipe that receives an input flow of water, where the input flow of water at any given time may correspond with a downstream demand for water from one or more appliances of a residential, commercial, or industrial setting. In other words, the input flow of water is intended to supply water to various appliances in accordance with a water demand of the various appliances. In general, the disclosed system may determine whether the input flow of water at a given time is within a threshold, and thereby determining whether leaks or fault conditions (e.g., serious leaks or fault conditions) exist.

For example, expected flow patterns (i.e., "flow signatures") of certain appliances of the residential or commercial setting may be input (e.g., manually input) to a processor of the system (e.g., as a received reference flow pattern/ signature). Additionally, the processor (or a different processor, such as a remote cloud-based processor communicatively coupled to the system) may monitor the input flow of water over time, and may compare certain flow patterns (i.e., flow signatures) with the water demand of one or a combination of appliances (e.g., as a learned reference flow pattern/signature). The processor (or a memory of the water monitoring system) may store the monitored flow patterns/ signatures as reference flow patterns/signatures for future use. It should be noted that the reference flow patterns/ signatures may include combinations of determined water demands (e.g., corresponding with combinations of appliances), such that the disclosed system can deduce a compound input flow (and a corresponding compound reference parameter) feeding water to several appliances. In other words, the system may store reference flow patterns/signatures corresponding with water demand of appliances used individually, and of appliances used simultaneously. The disclosed system may, after receiving and/or learning the above-describe reference flow patterns/signatures, compare actual flow parameters (or patterns) of detected input flow (e.g., via sensors) with the reference flow patterns/signatures. If the system cannot match the detected flow parameters (or patterns) with any of the reference flow patterns/ signatures, the system may initiate a shut-down mode to close valves and prevent water leaks from potentially causing damage to a structure, as described below.

In some embodiments, the system may determine whether the detected water flow exceeds certain threshold limits prior to initiating the shut-down mode. In addition, the system may determine whether the actual flow patterns match the reference flow patterns/signatures prior to initiating the shut-down mode. For example, one threshold may relate to a duration of the input flow of water. The durational limit may be included to ensure that the shut-down mode will not be activated for short-duration input flows of water.

Other threshold limits are also possible, and may be learned (e.g., by the above-described processor[s]) or manually entered. For example, another threshold limit may relate to maximum actual flow rate, so that the disclosed system does not operate to stop water supply to the appliances in the event of a minor leak having a low flow rate. In other words, the max flow rate threshold limit may be included in embodiments where detection of minor leaks is not desired (e.g., the system may not detect fault conditions associated with a minor leak from a single appliance having a low water demand). In some embodiments, only one threshold limit is required to be met, while in other embodiments, multiple threshold limits may be required to be met in order to initiate the shut-down mode and/or to characterize the actual input flow of water. In general, the threshold limits may be considered prior to comparing the actual input flow of water with the reference flow patterns/signatures to reduce processing power required to operate the system.

After determining that the detected flow parameter (e.g., of the actual flow pattern) exceeds or meets the threshold limit(s), the processor may search for a match between the detected input flow of water over time and one of a collection of reference flow patterns/signatures that may correspond to a collection of appliances, water tools, water dispensers, or the like. If the detected input flow of water over time (e.g., a flow rate of the input flow of water plotted against time, or the "actual flow pattern/signature") matches one of the reference flow patterns/signatures, the system may determine that no fault condition has occurred. The system may then re-initializing the process to continuously monitor the detected input flow of water for fault conditions. For example, the system may be tuned to continuously or periodically sample the input flow of water. However, if the input flow of water does not match one of the reference flow patterns, the system may operate to initiate (or selectively initiate) a shut-down mode. In some embodiments, the system may determine whether a secondary confirmation is present before initiating the shut-down mode. For example, the secondary confirmation may include an indication that the input flow of water exceed the above-described threshold limit(s) by at least a certain percentage (e.g., 10%) of the threshold limit.

Further, the disclosed system may notify a user, owner, or manager of the residential or commercial setting when a leak has been detected. For example, the system may notify the user in response to the above-described secondary confirmation. In some embodiments, the disclosed system may enable the user, owner, or manager to bypass the shut-down mode (e.g., in the event the user, owner, or manager does not deem the shut-down mode appropriate). If no bypass instruction is received, the disclosed system may close a shut-down valve (or activate some other shut-down device or function) to impede the water flow to the appliances.

It should be noted that, because of the capability of the processor to learn reference flow patterns/signatures corresponding with input flows reflecting use of a singular appliance or simultaneous use of multiple appliances (and to receive manually entered reference flow patterns/signatures), the disclosed system is well equipped to detect fault conditions regardless of the number of appliances included in the setting/system, and regardless of seasonal changes to water demand of the various appliances in the residential, commercial, or industrial setting. Further, the system is robust and capable of functioning with fewer sensors than traditional configurations. That is, in some embodiments, the system may receive data related to the input water flow over time and data related to the operations of various appliances over time. The system may categorize water flow patterns based on the operations of the appliances or a combination of appliances. These learned water flow patterns/signatures may then be stored in a database or memory component to determine whether leak conditions are present as described above.

Figure 1:
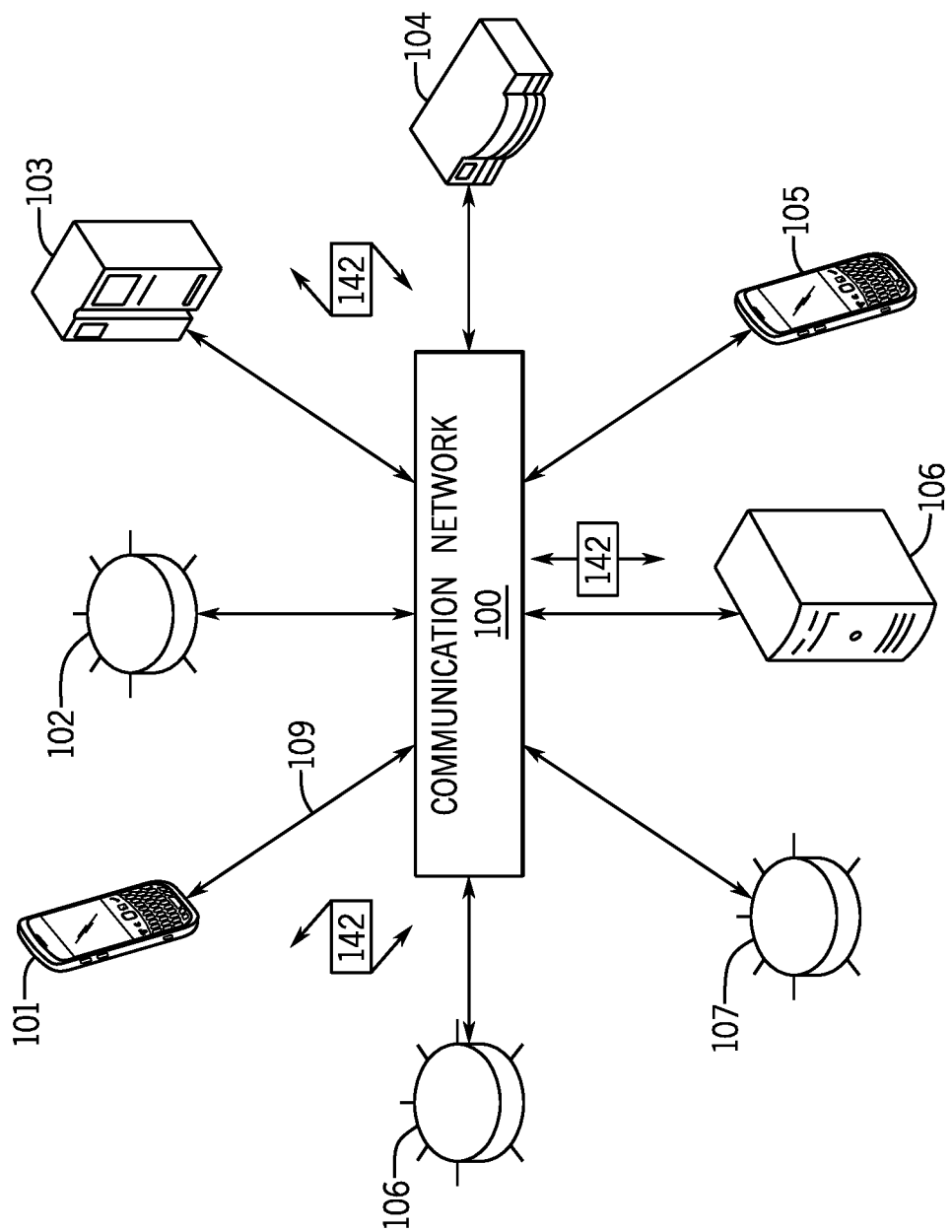
FIG. 1 is a schematic representation of an embodiment of a communication network, in accordance with an aspect of the present disclosure.

Turning now descriptively to the drawings, FIG. 1 depicts an exemplary communications network 100 in which the embodiments described above and illustrated in the following figures may be implemented.

It is to be understood a communication network 100 is a geographically distributed collection of nodes interconnected by communication links and segments for transporting data between end nodes, such as personal computers, work stations, smart phone devices, tablets, televisions, gaming/media consoles, smart watches, smart wristbands, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

With this in mind, FIG. 1 is a schematic block diagram of an example communication network 100 illustratively comprising nodes/devices 101-108 (e.g., sensors 102, client computing devices 103, databases 104, smart phone devices 105, web servers 106, routers 107, switches 108, and the like) interconnected by various methods of communication. For instance, links 109 may be wired links or may include a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer programs products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
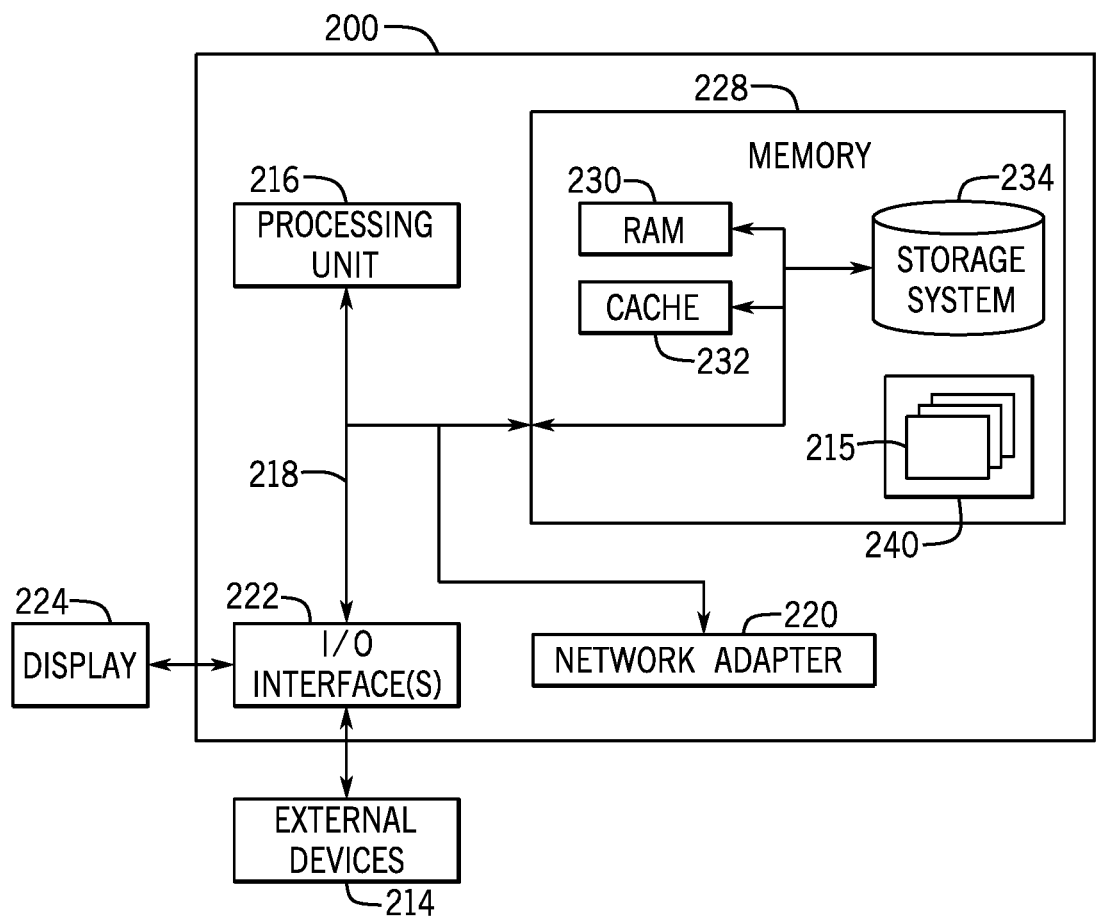
FIG. 2 is a schematic representation of an embodiment of a computer controlled network device/node used in conjunction with the communication network of FIG. 1, in accordance with an aspect of the present disclosure.

FIG. 2 is a schematic block diagram of an example monitor module 200 such as the client computing device 103, the server 106, etc. The monitor module 200 (or components thereof) may be used with one or more embodiments described herein, e.g., as one of the nodes shown in the network 100. As explained above, in different embodiments these various devices are configured to communicate with each other in any suitable way, such as, for example, via the communication network 100.

The monitor module 200 is intended to represent any type of computer system capable of carrying out the teachings of various embodiments of the present disclosure. The monitor module 200 is one example of a suitable system and is not intended to suggest any limitation as to the scope of use or functionality of embodiments of the present disclosure described herein. Regardless, the monitor module 200 is capable of being implemented and/or performing any of the functionality set forth herein.

The monitor module 200 is operational with numerous other general purpose or special purpose computing system environments or configurations. Examples of well-known computing systems, environments, and/or configurations that may be suitable for use with the monitor module 200 include, but are not limited to, micro-controllers, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

The monitor module 200 may be described in the general context of computer system-executable instructions, such as program modules, being executed by a computer system. Generally, program modules may include routines, programs, objects, components, logic, data structures, and so on that perform particular tasks or implement particular abstract data types. The monitor module 200 may be practiced in distributed data processing environments where tasks are performed by remote processing devices that are linked through a communications network. In a distributed data processing environment, program modules may be located in both local and remote computer system storage media including memory storage devices.

The monitor module 200 is shown in FIG. 2 in the form of a general-purpose computing device. The components of the monitor module 200 may include, but are not limited to, one or more processors or processing units 216, a system memory 228, and a bus 218 that couples various system components including the system memory 228 to the processor 216.

The bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The monitor module 200 typically includes a variety of computer system readable media. Such media may be any available media that is accessible by device 200, and it includes both volatile and non-volatile media, removable and non-removable media.

The system memory 228 can include computer system readable media in the form of volatile memory, such as random access memory (RAM) 230 and/or cache memory 232. The computing device 200 may further include other removable/non-removable, volatile/non-volatile computer system storage media. By way of example only, a storage system 234 can be provided for reading from and writing to a non-removable, non-volatile magnetic media (not shown and typically called a "hard drive") and from remote located database (e.g., "cloud" based storage devices). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other media (e.g., a USB storage device) can be provided. In such instances, each can be connected to the bus 218 by one or more data media interfaces. As will be further depicted and described below, the memory 228 may include at least one program product having a set (e.g., at least one) of program modules that are configured to carry out the functions of embodiments of the disclosure.

Program/utility 240, having a set (at least one) of program modules 215, such as underwriting module, may be stored in the memory 228 by way of example, and not limitation, as well as an operating system, one or more application programs, other program modules, and program data. Each of the operating system, one or more application programs, other program modules, and program data or some combination thereof, may include an implementation of a networking environment. The program modules 215 generally carry out the functions and/or methodologies of embodiments of the disclosure as described herein.

The monitor module 200 may also communicate with one or more external devices 214 (either via a wired connection or wireless), such as a keyboard, smart phone device, a pointing device, a display 224, etc.; one or more devices that enable a user to interact with the monitor module 200; and/or any devices (e.g., network card, modem, etc.) that enable the monitor module 200 to communicate with one or more other computing devices. Such communication can occur via Input/Output (I/O) interfaces 222. Still yet, the monitor module 200 can communicate with one or more networks such as a local area network (LAN), a general wide area network (WAN), and/or a public network (e.g., the Internet) via a network adapter 220. As depicted, the network adapter 220 communicates with the other components of the computing device 200 via the bus 218. It should be understood that although not shown, other hardware and/or software components could be used in conjunction with the device 200. Examples include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
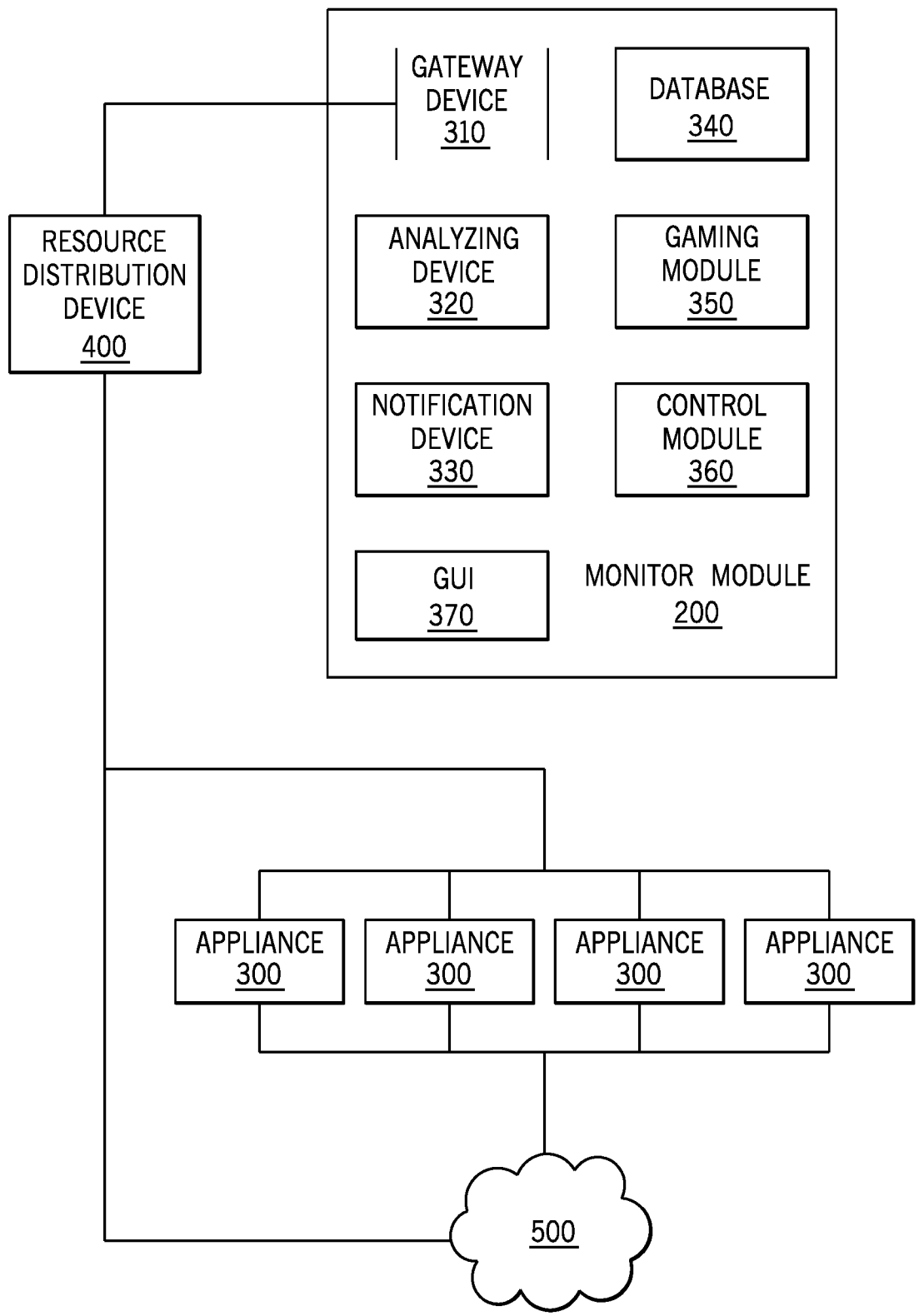
FIG. 3 is an embodiment of a resource flow monitoring system, in accordance with an aspect of the present disclosure.

With the exemplary communication network 100 (FIG. 1) and monitor module 200 (FIG. 2) being generally shown and discussed above, description of certain illustrated embodiments of the present disclosure will now be provided. With reference now to FIG. 3, it is to be understood and appreciated significant development and use of "smart home" related technologies have been made and the smart home sector is advancing rapidly. The illustrated embodiments provide a hardware and software control system operational and configured to provide centralized monitoring and/or control of appliance devices, preferably from aggregated appliance data. It is to be understood, appliance devices 300 as referred to herein consists of resourcing consuming devices that consume one or more of electricity, water, gas and oil (hereinafter collectively referred to as "resources"). Examples include (and are not limited to): HVAC systems, compressor systems, clothes dryers, clothes washers, water management systems, dishwashers, cooking ovens, media and entertainment systems, cooking ranges (gas and electric), lighting systems, household appliances (coffee makers, toasters, other plug-in devices); personal and/or portable computer systems and devices; water heaters; refrigerators and other appliance configurations configured to consume one or more resources (e.g., electricity, water, gas and/or oil). The appliances 300 may be associated with a household or a commercial establishment. The appliances 300 may also be associated with a predetermined grouping of households (as discussed further below).

Each appliance 300 is preferably operatively coupled to one or more resource distribution devices 400 configured and operable to deliver energy resources (e.g., electricity, water, gas and/or oil) to the coupled appliances. For instance, exemplary resource distribution devices 400 may include an electrical fuse box, a water metering device and/or a gas metering device. For ease of description and illustration purposes, only a single resource distribution device 400 is shown, however it is to be understood the presently disclosed embodiments may encompass use of various types of resource distribution devices 400 to each deliver a specified resource type (e.g., electricity, water, gas and/or oil).

The monitor module 200 in accordance with an illustrated embodiment preferably includes one or more of a: gateway device 310; analyzing device 320; notification device 330; database 340; gaming module 350; and a control module 360, the functionality of each is briefly described below. It is to be appreciated, each aforementioned component may exist as a standalone component (as illustrated in FIG. 3), or may be combined with one another.

Starting with the gateway device 310, it is preferably configured and operative to operably couple to the one or more resource distribution devices 400 to capture operational data relating to one or more of the appliances 300. Such operational data may include one or all operating parameters of an appliance (e.g., resource consumption, resource consumptions rate, operation load levels, operation time periods, operation efficiency and the like). It is to be appreciated the gateway device may be hardwired to the one or more resource distribution devices 400 and/or appliance devices 300, or alternatively may be connected thereto wirelessly through any known network means (e.g., WAN, LAN, WiFi, Bluetooth, NFC, cellular, the Internet, or any other suitable ad-hoc network type) including usage of a "cloud" based service system 500.

Monitor module 200 further includes analyzing device 320 that may determine individual operational characteristics for one or more of the appliances 300 via analysis of captured operational data, preferably via data disaggregation techniques (as further described below). Notification device 330 is preferably configured and operative to provide information (e.g., via a GUI, text message, email and the like) to a user (e.g., homeowner, building manager or other designated individuals) regarding determined operational characteristics for the one or more appliances 300.

The monitor module 200 further preferably includes a database 340 containing expected operating thresholds formed from individual appliance power consumption for the one or more appliances 300 (e.g., electrical, water or gas use and run time data). The database 340 may interact with the notification device 330, for instance, to alert a user upon variation of individualized operational data from expected operating thresholds for the one or more appliances 300. It is to be appreciated the analyzing device 320 and database 340 may be Internet-based (e.g., "cloud" based 500) and thus located remote from the gateway device 310 so as to be arranged in communication with the gateway device 310 to receive and process captured operational data regarding the one or more appliances 300. It is to be further appreciated the analyzing device 320 and database 340 may be configured and operational to determine operational characteristics of appliances 300 from a plurality of different households, the significance of which will be appreciated below. The significance of which will also be appreciated from the below description, the database 340 may include stored information relating to a specific appliance type, data may include historically-compiled data filtered through a statistical analysis. The database 340 may still further include a second database having commercially-available operational data for a range of appliances and a third database having recommendations data enabling the analysis device 320 to compare appliance operational data with both the historically-compiled data and commercially-available operational data to provide a recommendation in conjunction with notifying a user.

A gaming module 350 may be further included within the (or operatively coupled to) monitor module 200 that is preferably configured and operative to provide gamification (electronic gameplay) utilizing the determined individual operational characteristics of one or more appliances 300. Examples of such gaming scenarios may include different members of a household challenging one another, different households challenging one another, or households may be grouped together to form teams which challenge one another (examples of teams include neighborhoods, members of a type of military service grouped together (e.g., Army, Navy) or other designated team types/categories).

A control module 360 may be further included within the (or operatively coupled to) monitor module 200 that is preferably configured and operative to control overall and individual resource consumptions by one or more appliances 300 in accordance with the teachings of one or more illustrated embodiments.

Additionally, monitor module 370 may be configured and operative to generate a graphical user interface that may (in association with the analyzing device 320) gather contextual information related to user activity and a daily schedule; gather information about user comfort and service preferences; display energy/water/gas use feedback to a user; display energy/water/gas saving opportunities in compliance with a user's evolving behavior; recommend use of renewable energy source and stored energy within a household; and display incentive or motivational information to a user based on observed energy/water/gas use behavior and adaptive to a user's energy/water/gas use pattern.

The aforementioned monitoring device 200 may also monitor a household's occupant activity levels, appliance usage, water and gas usage, for configuring an appliance, water or gas source use schedule to achieve energy/water/gas savings associated with home operation. Additionally, the monitoring device 200 may detect and determine a life event change by detecting usage variations for one or more of electricity, water and gas consumption to determine a life change event in a dwelling (e.g., birth, death, divorce, child off to college, bought a new electric car that they charge into the home, bought a new appliance that needs a warranty, etc.).

Figure 4:
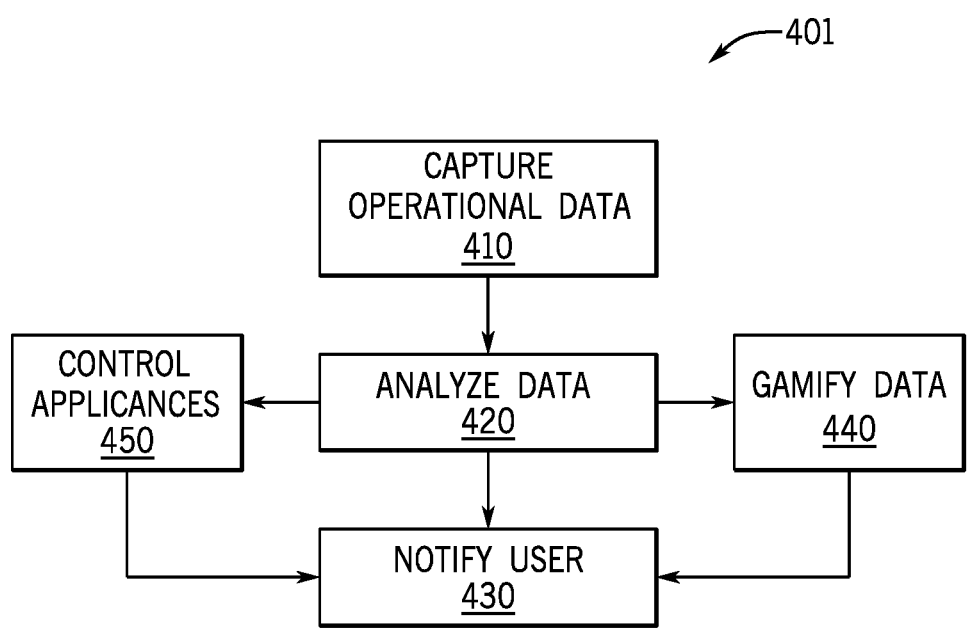
FIG. 4 is an embodiment of a process flow diagram depicting operation of the resource flow monitoring system of FIG. 3, in accordance with an aspect of the present disclosure.

With reference now to FIG. 4, flow chart 401 demonstrates implementation of various exemplary embodiments described herein. It is noted that the order of steps shown in FIG. 4 is not necessarily required, so in principle, the various steps may be performed out of the illustrated order. Also, certain steps may be skipped, different steps may be added or substituted, or selected steps or groups of steps may be performed in a separate application following the embodiments described herein.

With reference to FIG. 4 (and with continuing reference to FIG. 3), starting at step 410, operational data from one or more appliance devices (300) may be captured and aggregated, via preferably the gateway device (310) coupled to the one or more resource distribution devices (400), as discussed above. Next, at step 420, the captured operational data may be analyzed in a de-aggregated state, via the analyzing device (320), to determine operational characteristics of the one or more appliances (300), as mentioned above. It is noted that the aforementioned analyzed data (step 420) may be gamified, via the gaming module (350), to present various electronic gaming scenarios as discussed above (step 440). Additionally, it is noted in another embodiment, the aforementioned analyzed data (step 420) may be utilized to control one or more operational aspects of the one or more appliances (300) via the gaming module (350), as also discussed above (step 450). Notification and possible action items to take may then be provided to a user in step 430 based upon the aforementioned analysis of aggregated data for operational characteristics for the one or more appliances (300), as mentioned above with reference to FIG. 3.

Figure 5:
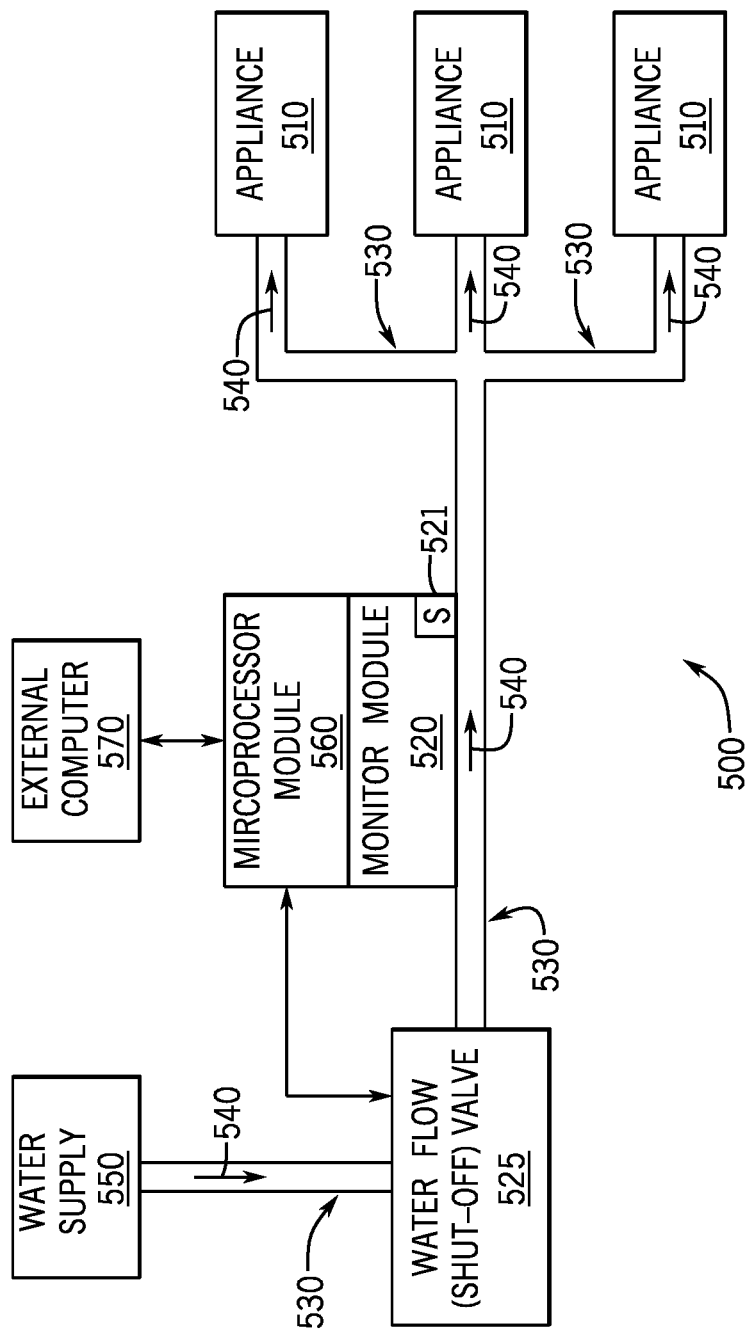
FIG. 5 is schematic representation of an embodiment of a water flow monitoring system, in accordance with an aspect of the present disclosure.

In accordance with another embodiment, reference is now made to FIG. 5 which illustrates a monitoring system 500 for determining water flow to one or more appliances 510 for determining water consumption by the one or more appliances 510. Additionally, the system 500 preferably throttles and/or terminates water flow to the one or more appliances 510 based upon a fault condition or other prescribed condition, as described below. It is to be appreciated a more detailed illustration of the system 500 is provided in FIG. 6 for exemplary purposes, but for ease of illustration purposes, description is provided to the simplified system diagram of FIG. 5.

It is to be further appreciated that the system 500 utilizes one or more of the components described and illustrated in the monitor module 200. It is to be further appreciated that while description of the system 500 is provided with a focus on water consumption, it is not to be understood to be limited thereto as it may also be integrated with one or more components and/or subsystems illustrated and described in FIG. 3 relative to consumption of other "resources" such as gas and electricity. Thus, it is to be likewise understood, the appliance devices 510 as referred to in FIG. 5 consists of resource consuming devices that consume one or more or electricity, water, gas and oil (hereinafter collectively referred to as "resources"). Examples include (and are not limited to): HVAC systems, compressor systems, faucets, bathtubs, showers, humidifiers, clothes dryers, clothes washers, water management systems, dishwashers, cooking ovens, media and entertainment systems, cooking ranges (gas and electric), lighting systems, household appliances (coffee makers, toasters, other plug-in devices); personal and/or portable computer systems and devices; water heaters; refrigerators and other appliance configurations configured to consume one or more resources (e.g., electricity, water, gas and/or oil). The appliances 510 may also be associated with a household or a commercial establishment.

For ease of illustration and description purposes, description is provided below in regards to consumption of water flow, and thus consumption of other resources is to be incorporated from description and illustration of FIGS. 3 and 4.

As illustrated in FIG. 5, the system 500 preferably includes a monitor module 520 operatively coupled to a conduit 530 (e.g., a pipe) which conveys a water flow 540 from a water source 550 (e.g., city water supply) to one or more water flow consuming appliance devices 510. The monitor module 520 may aggregate data from a plurality of appliances 510 to capture operational data relating to each of the plurality of appliances 510 for analytical purposes described herein.

While the illustrated embodiment of FIG. 5 depicts the system 500 having a single conduit 530 and shut-off valve 525, it is to be appreciated that the monitor module 520 may couple to a plurality of conduits 510 in a property or the system 500 that may include a plurality of monitor modules 520, whereby each monitor module 520 is preferably coupled to a respective conduit 510.

The monitor module 520 may sense and determine a flow rate (or mass flow rate, flux, etc.) of the water flow 540 through the conduit 530 via a water flow sensor device 521. The water flow sensor device 521 (or devices, as previously described) may operatively couple to the conduit 530 via either non-invasive techniques (e.g., sonar techniques) and/or invasive techniques (e.g., where the sensor 521 positioned in the water flow 540). In some embodiments, the water flow sensor device 521 may represent several sensors, each sensor configured to detect a different parameter. Additionally, the single water flow sensor device 521 in the illustrated embodiment may detect multiple flow parameters.

The monitor module 520 may be operatively coupled to a water flow valve 525 for controlling the water flow 540 to the one or more appliances 510, as to be discussed below. As also described further below, the monitor module 520 is operatively coupled to a microprocessor module 560, which is preferably coupled to an external computing device 570 (e.g., cloud-based computing device). It is noted the monitor module 520 may be positioned either upstream or downstream of the water flow valve 525. As also described further below, the microprocessor module 560 may include program memory providing an algorithm functional to determine a baseline operation for water flow consumption/usage for the appliances 510 (e.g., the water consumption associated with the master bedroom toilet, or a flow pattern/signature, as previously described).

The shut-off valve 525 may be coupled to an intake portion of the conduit 530 (e.g., in proximity to the water supply 550), where the shut-off valve 525 is operatively coupled to the monitor module 520, such that the monitor module 520 controls the water flow 540 through the conduit 530 via controlled operation of the shut-off valve 525. As will be apparent from the below description, the monitor module 520 may control operation of the shut-off valve 525 dependent upon a determined usage pattern for the one or more of the appliances 510. That is, the monitor module 520 may determine a water leak regarding the one or more appliances 510 when water flow to an appliance 510 exceeds a determined baseline consumption for the appliance(s) 510, or deviates from the flow pattern/signature of the appliance(s) 510.

The monitor module 520 (e.g., via microprocessor module 560) may detect the various water flow usage parameters/patterns of the one or more appliances 510 over a period of time to determine a baseline operation for each appliance 510. For instance, the monitor module 520 may detect a certain appliance 510 uses 15 gallons of flow per usage; thus, its determined baseline operation is 15 gallons (e.g., a washer machine) per use. Thus, in accordance with an illustrative embodiment, the monitor module 520 may control the shut-off valve 525 to cease water flow in the conduit 530 to this washer machine appliance 510 when water flow to it exceeds its determined baseline consumption value (e.g., 15 gallons) by a threshold value (e.g., 10%, 30 gallons). Detection of, and comparison between, flow parameters/patterns other than volume is also possible, such as a flow rate of the water flow 540, a mass flow rate of the water flow 540, a flux of the water flow 540, and the like. Further, as will be appreciated in view of the description (and corresponding figures) below, the water flow 540 proximate the monitor module 520 may include a compound supply of water for multiple appliances 510 simultaneously, and the disclosed system is capable of determining whether the water flow 540 includes a parameter matching the potential compound supply of water for multiple appliances 510 simultaneously. Operation of the system 500 is described in more detail below (and later with reference to FIGS. 9 and 10). For example, as discussed below (and later with reference to FIGS. 9 and 10), the system 500 may activate a shut-down mode (e.g., by controlling the shut-down valve 525) in response to an actual input flow of water (e.g., detected via sensor) exceeding the above-described threshold limits in addition to the actual input flow of water failing to match a flow pattern/signature of one or more appliances, where the flow pattern/signature of the one or more appliances involves a time-dependent analysis of the flow parameters associated with particular appliance(s).

For example, the monitor module 520 may further couple to an external computing device 570 preferably having a display for providing notification to a user regarding the determined water flow usage pattern and any related data or notifications for the one or more appliances 510. It is to be appreciated that the monitor module 520 preferably wirelessly couples to the external computer device 570 (which may also be associated with a cloud based computer server). This external computer device 570 may control operation of the shut-off valve 525 in accordance with the one or more illustrated embodiments. Examples of the external computing device 570 include, but are not limited to: smart phone, tablet, laptop and other portable and desktop computing devices (wherein the external computing device 570 preferably wirelessly couples to the monitor module 520 via an associated IP address). Additionally, it is to be understood that the microprocessor module 560 may be located in a computing device located external of the monitor module 520.

Examples of uses for the determination of water flow usage by the monitor module 520 include (but are not to be limited to): determining real-time water usage for one or more of the appliances 510; perform, and recording data, regarding sub-metering (preferably for a predetermined time period) for one or more of the appliances 510; determining occupancy count and/or type (e.g., age) associated with a property based upon the determined water flow usage pattern for one or more of the appliances 510; determine usage rate of an appliance 510 (e.g., how many times a day and/or what times of day is an appliance utilized) based upon the determined water flow usage pattern; determine identification of an appliance type (e.g., toilet, faucet, dishwasher, etc.) based upon the determined water flow usage pattern; determining an appliance condition (e.g., is it using more water than expected) based upon the determined water flow usage pattern; determining material used in the conduits 530 (e.g., lead, stainless steel, PVC, etc.) for providing water flow to the one or more appliances 510; determining the condition of the conduits 530 (e.g., presence of leakage/seepage) for providing water flow to the one or more appliances 510; identifying an insurance claim event (e.g., washer machine overflowed causing surrounding water damage) regarding detected water flow to the one or more appliances 510; identifying when water flow to the one or more appliances 510 exceeds a budgetary threshold value prescribed by a user (e.g., an occupant is taking a hot shower longer than a prescribed time period, washing machine operating at a frequency greater than a prescribed threshold value); determining composition components (e.g., hardness, mercury level) present in water flowing through the conduit 530; determining the operational cost associated with usage of a certain appliance 510 based upon its determined water flow usage; determining a location of a water leak in one or more conduits 530 coupled to the conduit 530 the monitor module 520 is coupled to; determining a water leak occurring at an output component of an appliance 510

(e.g., a drain); determining unauthorized occupancy in a property via detection of certain water flow associated with the property (e.g., a shower and/or faucet is operated when the alarm system was set or the property occupants otherwise provided notice to system 500 of their absence from the property for a certain time period); and determining individual operational characteristics for each of the appliances via analysis of the captured operational water flow data (e.g., how long does each occupant take bath for and/or the frequency of baths taken by each occupant).

In accordance with a preferred embodiment, the monitor module 520 may throttle water flow to the one or more appliances 510 when the detected water flow exceeds a threshold value. For instance, when an occupant is taking a hot shower for an amount of time that exceeds a time threshold, hot water flow may be throttled to the shower appliance 510.

In additional embodiments, the system 500 may include a battery charging component (e.g., a spinning turbine element) positioned within the water flow 540 of a conduit 530 to create electrical current to be used for charging one or more battery operated modules utilized in the system 500 for monitoring water flow.

It is to be appreciated that the water flow 540 to a residence is measured by the monitor module 520 and preferably interpreted for anomalies in real-time and interrupted to mitigate resulting damage. It is noted such measurements can occur at a single location that contains the water flow 540 for an entire residence, or on specific flow circuits in the residence that may be deemed high risk. The water flow 540 is preferably disrupted through the use of the shutoff valves or flow switches 525 to stop or divert the water flow 540 from failed sections of the residence's plumbing system. Certain particular features of the monitor module 520 include: the ability to detect occupancy of the residence either through intentional action (similar to alarm system mode states), or by passive inference from proxy measurements (detecting motion, noise, electricity usage, presence of personal devices MAC address or UDID); the ability to capture and store a characteristic of the water flow 540 and pressure signatures for all of the appliances 510, water outlets and plumbing used in a residence (where, e.g., this type of characteristic flow rate information could also be applied to electricity and gas flows in the residence to couple with water to create a deeper knowledge of use of the residence); the ability to anticipate and adapt to flow signature change over time for the one or more appliances 510 as configuration and fitness of the system 500 changes e.g. pipe calcification, new shower head, different dishwasher setting usage; the ability to relate the present time-series flow measurement to historical norms, producing a leak 'certainty' metric (e.g., does an occupant typically take a shower around a certain time of day, if yes the 'certainty' metric is low for a time range proportional to previous shower events); the ability to measure both the water flow 540 into the residence and out of the residence to determine if water flow 540 has by-passed the intended flow route 530; the ability to programmatically modify (preferably via the microprocessor module 560) the criteria for determining a leak or abnormal flow condition for the one or more appliances 510 based on historical water usage, time of day, occupancy, and other inputs to the residence that are coincident with the water flow 540 such as electricity use or natural gas use.

It is to be appreciated that the monitor module 520 may monitor flow magnitude, timing and leak certainty. Criteria can be applied to any or all of these variables to trigger a response (which criteria are not fixed but a function of other state variables such as those described above). Thus, a method involves direct correlation of measurements of the water flow 540 with appliance/outlet flow pattern signatures or aspects of the flow pattern that are indicative of the entire flow event (e.g. flow rise rate, peak magnitude, flow decline rate, or other unique flow profile patterns). In addition, another method involves evaluating multiple appliances/outlets used at a same time and identifying which appliances/outlets 510 are being used based on a combination of nominal flow rates of the known appliances 510. Once identified, the system 500 may refer back to the first method to accurately track and predict water flow 540 behavior. Another method that may be employed by the monitor module 520 involves a "Wait" function in case flow rates and flow patterns cannot be recognized. An object is to monitor the water flow 540 and pressure for characteristics that will allow them to be associated with known appliances 510 using the aforementioned methods. A timer may limit the amount of time that any of the above methods are applied (e.g., if a prescribed time is exceeded a "potential leak" flag will be set.). Additionally, the monitor module 520 may perform a leak detection method whereby if water flow rates are determined to exceed typical measured water flow rates, a "leak" flag is set without completing the aforementioned three described methods.

It is to be appreciated the system 500 performs an adaptive learning functionality whereby the signature flow patterns for one or more of the appliances/outlets 510 are updated continuously using newly recorded data. Additionally, potential degradation of the appliances/outlets 510 can be detected if unusual trends in reference data are determined. In particular, to provide enhanced accuracy, to quantify a potential leak and to reduce the occurrence of potential "false positives", the system 500 may characterize flow pattern signatures of various appliances and water outlets 510 (e.g. faucets, showers, etc.) and compare instantaneous water flow measurements to recorded data to determine whether the measured flow 540 is to be associated with a specific appliance or outlet 510, or if the flow 540 is of an unknown type (such as a leak). In accordance with an illustrated embodiment, the leak detection logic of system 500 preferably utilizes an embedded controller in the monitor module 520, whereby the water flow 540 rate and pressure data is acquired and stored, if necessary, at an acquisition rate of preferably 1 Hz, 2 Hz, or higher. It is noted that, if desired, other optional sensor signals such as multiple pressures, electrical current, occupancy, etc., can be included in the data acquisition.

Additionally, the aforementioned controller (e.g., the monitor module 520) of the system 500 may communicate via Wi-Fi and can accept over-the-air updates to various tuning parameters and, potentially, firmware updates. For instance, when the water flow 540 is detected (e.g. a faucet has been opened or the appliance 510 has been turned on), the flow data is recorded for a predefined time period (e.g. 2-30 seconds). It is noted the time period might vary dependent on the actual flow rate and/or the initial characteristics of the flow pattern (e.g. step change in water flow with quick stabilization in flow rate or slow changes in water flow rates with slow stabilization). In certain embodiments, the measured water flow rate is corrected for differences in current water pressure and reference water pressure (e.g., water pressure at the time when appliance flow signatures were captured) via:

$$\text{Flow}_{Corr} = \text{Flow}_{act} * \sqrt{\frac{P_{act}}{P_{ref}}} \qquad \text{(Equation 1)}$$

Figures 7, 8:
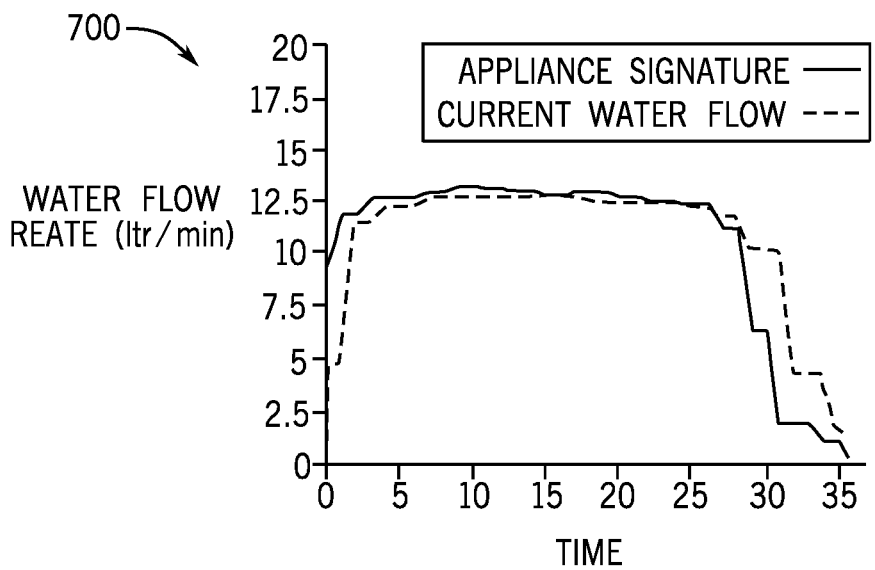
FIG. 7 is an embodiment of a data plot mapping the actual flow rate over time of FIG. 6 against a reference flow signature of a particular appliance, in accordance with an aspect of the present disclosure.
FIG. 8 is an embodiment of a chart illustrating a match between the actual flow rate over time of FIG. 6 with the reference flow signature of a particular appliance, in accordance with an aspect of the present disclosure.

With regards now to the aforementioned method to associate flow with known outlets, in accordance with an illustrated embodiment, after initial flow data recording is completed, the system 500 may compare the data for this period to each of the appliance flow signatures to determine the closest matching pattern. After a matching pattern has been determined, a predictive model may display the anticipated flow pattern and continue to track any error between the predicted flow pattern and the actual flow rates, where after: a) Recording flow data is continued; b) Flow differential (ΔFlow) is calculated between appliance flow signatures (FRef) and actual flow (Fw) using the root mean squared error (RMS) method; c) Based on the flow differential data, the appliance with smallest flow differential is identified; d) the aforementioned steps a-c are repeated with each control loop iteration enabling the pattern recognition process to improve with time; and e) Since the majority of water outlets operate as ON-OFF valves, increased emphasis may be placed on the flow characteristics during the ON time than the ON or OFF duration. However, for the water outlets or appliances 510 where the timing of water flow is repetitive and can be made part of the signature (e.g. dishwasher, washing machine, ice maker, etc.) the timing information can be used to further improve the pattern recognition process and, thus, improve the response of the system 500. FIG. 8 illustrates a screen display of the software functionality (and corresponding data plots) using the aforementioned primary method.

With regard now to the aforementioned method to associate flow 540 with known one or more known outlets 510, a threshold for the calculated flow differential may be utilized to govern whether the measured flowrate can be associated with a particular appliance 510 or if the current flowrate is outside any known flow pattern. If the calculated flow differential exceeds the threshold, this method to associate the measured flow with known outlets may be utilized. Furthermore, after the association with a known appliance 510 has been established, a significant shift in flowrate (e.g., where the calculated flow differential increased drastically) may trigger the initiation of this method. For instance, to trigger this method, the following illustrative scenarios are possible: a) Multiple water outlets are used at the same time (staggered turn-on times): a second outlet is turned on after the first outlet has been running for a while and after this flow has been successfully associated with a known appliance 510, the difference between the total flow and the flow of the first outlet (which is known at this point) can be utilized to match the flow pattern for the second outlet using the first method described above. However, it is to be appreciated the measured flow rates may be corrected again for the additional decrease in pressure related to operating two outlets at the same time. And if b) multiple water outlets are used at the same time (simultaneous turn-on times): a second water outlet is being operated at the same time as the first outlet and before the first flow could be associated with known appliance signatures, the system 500 preferably searches for a combination of nominal appliance flow rates that is similar to the currently measured water flow. After this combination is found, the flow patterns for the two or more appliances that were identified may be combined to track and predict the current water flow.

With regards now to the aforementioned method to associate flow with a known outlet (e.g., the "Wait method"): it is noted this method may be executed by system 500 when multiple water outlets are being operated and neither the aforementioned primary nor the secondary methods can be used successfully in associating the measured water flow 540. For this method, water flow 540 may be monitored until a flow rate that matches the nominal flow rate of one or more appliances 510 is recognized. After this recognition occurs, one or both of the aforementioned methods is applied to correlate the measured water flow with known appliances 510. The time duration for which the third method is in effect may be limited. It is noted this time limit is variable and can be used to tune the behavior of the subject third method (and, in part, the leak detection sensitivity).

And with regards now to the leak detection method, if detected water flow rates are measured that are significantly above the typical water flow of a residence, a "leak" flag may be triggered prior to the completion of the aforementioned three described methods. In some embodiments, the threshold for such a leak is variable and can be defined by the following parameters: a) Fixed flow rate value, entered by the user; b) Max flow rates of multiple appliances combined (3-4 appliances/outlets); and c) Max value of measured flow rates are recorded and multiplied by predefined factors wherein a delay function (e.g. 1-60 seconds) may be used to prevent false triggers due to signal noise or short time signal read-out errors. It is to be appreciated a "potential leak" flag may be set if none of the three described methods can be utilized to successfully correlate the measured water flow with a known appliance or if the "leak" flag is on. The "potential leak" flag can then be used in combination with other determining factors, such as occupancy, time of day, electrical current measurement, etc. to provide notification to the home owner and, if deemed appropriate, turn off the main water valve preferably via the shut-off valve 525.

Accordingly, in view of the above description of the one or more illustrated embodiments, it is to be appreciated the subject system 500 provides adaptive learning functionality whereby when a measured flow pattern can be associated with a given appliance 510, the reference signature for this appliance 510 (flow pattern and reference pressure) will be updated with the newly acquired data, thus enabling the system 500 to utilize adaptive learning to improve its response. It is noted that there is likelihood that flow profiles will have uncertainty in both magnitude and phase. These uncertainties are captured in the profile definition and the predictions that originate from those profiles. This allows the controller 520 to adapt to changing behavior in the system 500. The mathematical uncertainty calculated for the potential 'leak' flow is provided to limit the errors of omission and commission when logically determining the presence of a leak. It is to be understood that when the magnitude of the determined leak flow is significantly (e.g., more than 10%) greater than the uncertainty of the calculation that action will be taken to disrupt water flow. The adaptive learning process may involve recalculating the appliance signature based on the average flow pattern using a certain number of previously recorded traces combined with the newly acquired trace. The number of previously recorded traces may be variable and can be used to tune the overall adaptive learning behavior of the system 500. Furthermore, the recorded flow patterns for a given appliance 510 can be analyzed for trends or for changes in characteristic behaviors which will enable the system 500 to identify unusual behavior or to predict potential problems with a particular appliance 510. For instance, if the closing behavior of a float valve mechanism, similar to the valves often found in toilet tanks, shows a substantial increase in closing duration with a prolonged period of low water flow, a degradation of the valve itself may have occurred which can ultimately lead to a failure of the valve. Flowrate traces acquired using the secondary or tertiary methods to associate flows with known outlets may or may not be considered for inclusion in the adaptive learning routine.

Figure 6:
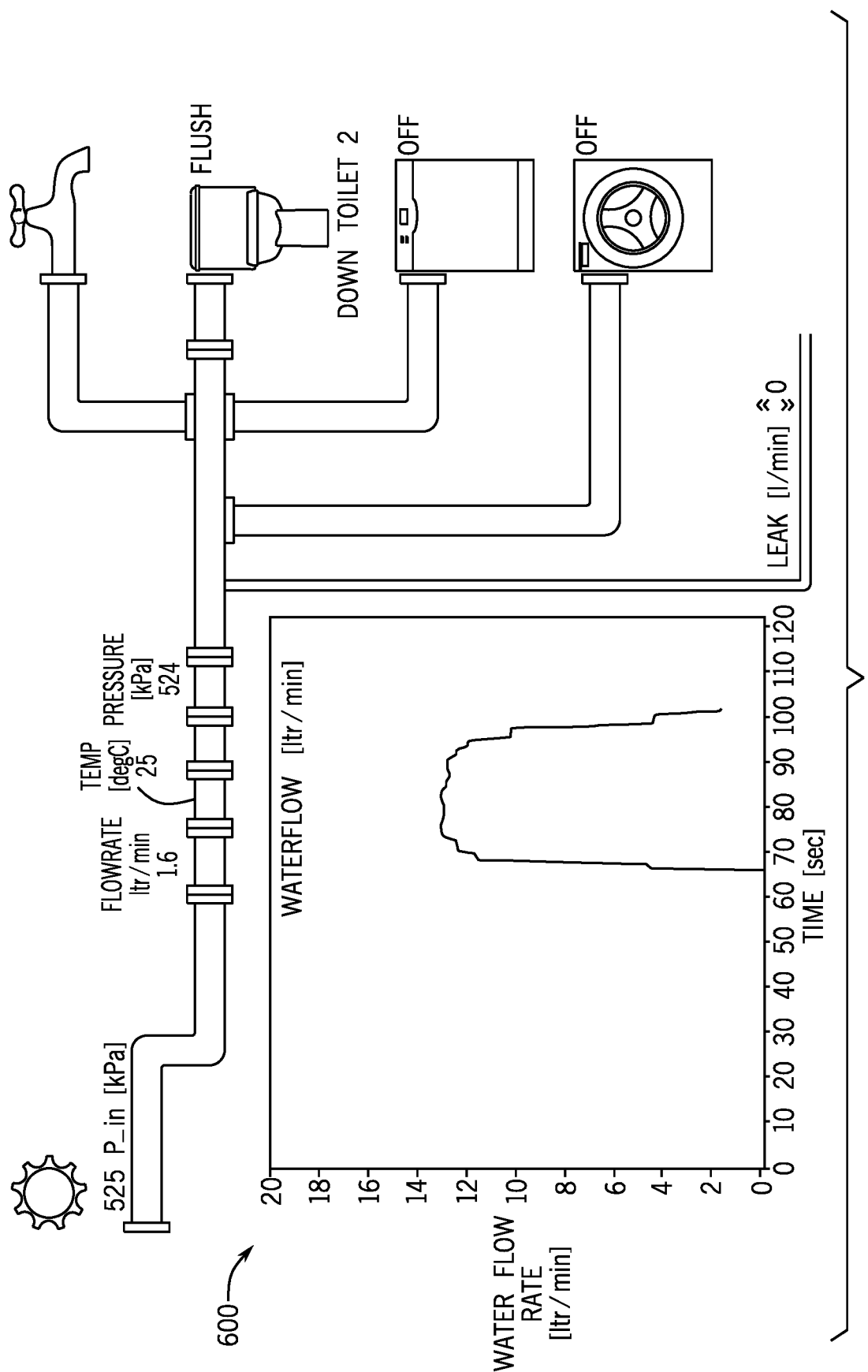
FIG. 6 is an embodiment of a data plot illustrating flow rate data over time, in accordance with an aspect of the present disclosure.

FIGS. 6-8 illustrate various data plots/charts that may be formulated, for example, by the monitor module 520, the microprocessor module 560, and/or the external computer 570 referenced in FIG. 5. For example, FIG. 6 includes a data plot 600 illustrating the actual flow rate of an actual input flow of water over time. As indicated in FIG. 6, the actual input flow of water may be used to supply water to a toilet following a flush of the toilet. FIG. 7 includes a plot 700 illustrating the actual input flow of water over time mapped against a particular reference flow pattern/signature, as previously described and as will be described with reference to FIGS. 9 and 10 below. For example, the reference flow pattern/signature corresponds with normal operation of the toilet, and, as shown in the illustrated embodiment, the actual input flow of water is considered a match with the reference flow pattern/signature of the toilet. FIG. 8 includes a data chart 800 illustrating how the reference flow pattern/signature of the downstairs toilet matches the actual input flow of water being analyzed by the system.

Figure 9:
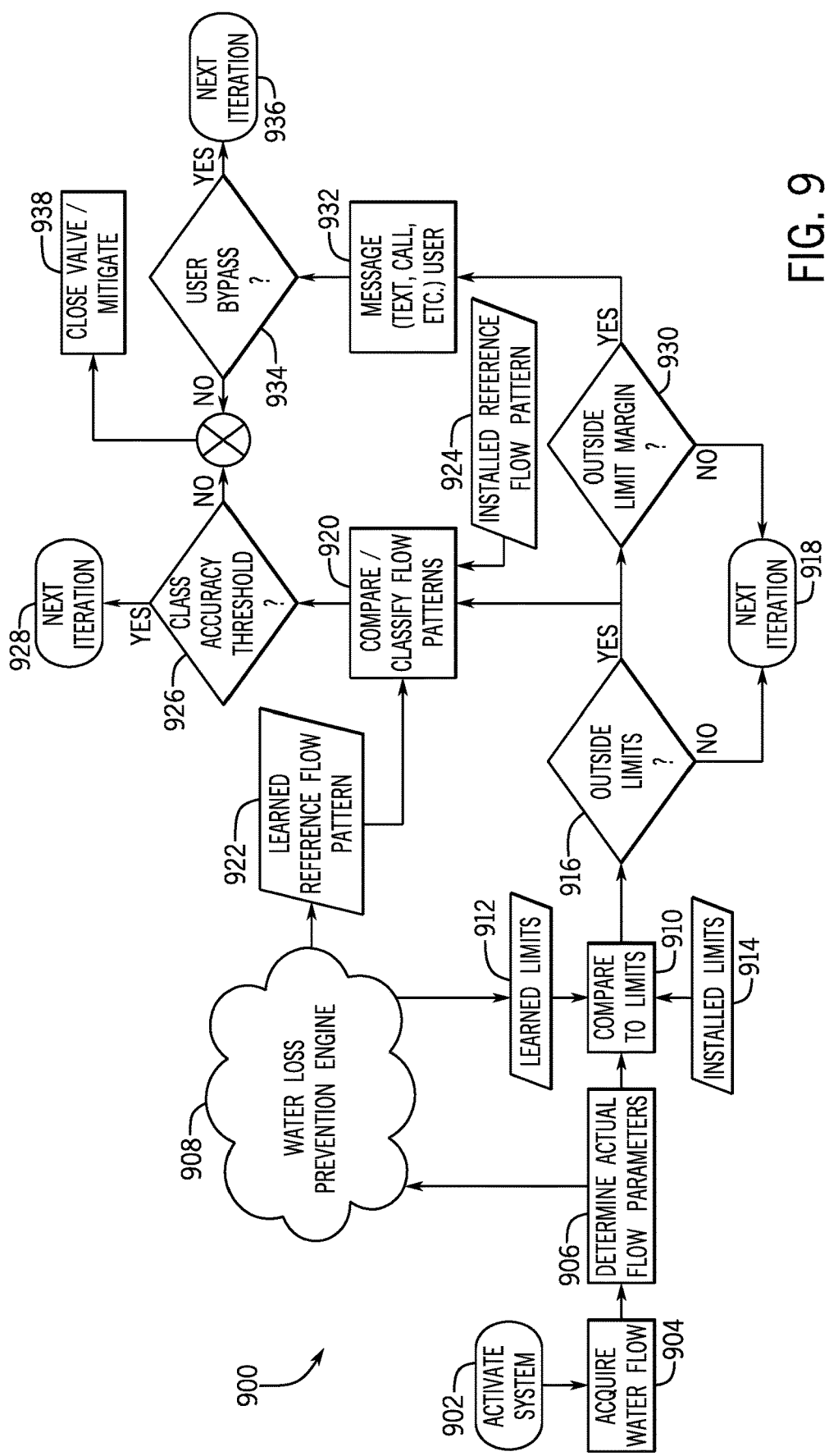
FIG. 9 is an embodiment of a process flow diagram depicting operation of a water flow monitoring system, such as the system illustrated in FIG. 5, in accordance with an aspect of the present disclosure.

Before continuing discussion with respect to FIG. 9, it should be understood that reference flow patterns/signatures, in some embodiments, may correspond with operation of two appliances/utilities simultaneously. In other words, certain reference flow patterns/signatures may correspond with the flow of water through a single pipe/conduit for use by two appliances/utilities. Disclosed systems and methods may determine reference flow patterns/signatures that correspond with these compound flows (i.e., to two or more appliances/utilities) in several ways. For example, as will be described in detail below, the system/method may include a machine learning component that determines the reference flow patterns/signatures associated with various flows (e.g., flows to a single appliance/utility, and flows to multiple appliances/utilities simultaneously). The machine learning component may determine the reference flow pattern corresponding with a compound flow to, for example, a toilet and a sink by summing/combining/etc. the individual reference flow pattern/signatures the toilet and the sink. In some embodiments, such a summing/combining process may include some compensation for, e.g., pressure loss (or another technical effect) that arises via utilization of both appliances/utilities together. The machine learning component may additionally or alternatively learn the reference flow pattern corresponding with the compound flow to, for example, the toilet and the sink by detecting actual flow when the toilet and the sink are operated simultaneously. In other words, the machine learning component may (a) determine compound reference flow signatures/patterns by utilizing an algorithm to combine individual reference flow signatures/patterns; and/or (b) determine compound reference flow signatures/patterns by sampling flow parameters during operation of the system/method (e.g., similar to the manner in which the machine earning component learns individual reference flow patterns/signatures).

FIG. 9 is an embodiment of a process flow diagram 900 depicting operation of a water flow monitoring system, such as the water flow monitoring system 500 of FIG. 5, in accordance with the present disclosure. In the illustrated embodiment, the process 900 may include activating the water flow monitoring system (block 902). For example, the water monitoring system may be activated by opening a valve in fluid communication with a conduit that supplies water to a number of appliances, or ensuring that the valve is already open. When the valve is opened, the conduit is capable of passing the water from a water supply to the various appliances. In other words, when the valve is opened, the conduit may acquire an input flow of water in corresponding with a water demand of the downstream appliance(s) (block 904).

The process 900 also includes determining actual flow patterns (e.g., actual flow parameters over a period of time) of the actual input flow of water through the conduit (block 906). As previously described, the water monitoring system may include a sensor that, for example, is disposed in (or proximate to) the water flow (or otherwise able to detect parameters of the water flow). The sensor may be any type of flow sensor, such as a sensor that detects a flow rate, a mass flow rate, a flux, or some other flow parameter. The sensor may detect the flow parameter(s) over a period of time, as previously described, to compare the input flow of water with a reference flow pattern/signature of one or more appliances. The flow parameter(s) over the period of time may be referred to as an actual flow pattern/signature, and as appreciated in the discussion below, may be compared against reference flow pattern/signatures stored to the system.

As shown in the illustrated embodiment, the detected actual flow pattern may be output to a water loss prevention engine 908. The water loss prevention engine 908 may learn various features of the water supply system being monitored by the water monitoring system. For example, the water loss prevention engine 908 may learn reference flow patterns/signatures that correspond with the actual use of one appliance and/or of several appliances simultaneously. In certain embodiments, the water loss prevention engine 908 may include a computing system or a cloud-computing system that received flow data regarding various appliances from a variety of sources. Based on the collection of flow data and the associations with various appliances, the water loss prevention engine 908 may identify trends and common features in various water flow patterns for the same appliance. Using these trends, common features, and additional analysis techniques, the water loss prevention engine 908 may determine expected flow patterns and water flow data with respect to the operations of various appliances. The learned behavior and data may be stored in a local or remote memory device for future analysis.

Further, the water loss prevention engine 908 may include (e.g., receive or learn) certain limits that are required to be exceeded by the actual flow pattern (or a point parameter thereof) to trigger further steps of the process 900 to detect a fault condition. It should be noted that the limits described herein may differ from the reference flow patterns/signatures described herein. For example, the illustrated process 900 includes comparing (block 910) the actual flow parameter(s) with installed limits 914 (i.e., user received limits) and/or learned limits 912. The learned limits 912 may be provided by the water loss prevention engine 908 that may determine expected limits of water flow and consumption for various appliances based on their previous water flow data.

The limits 912 and/or 914 may, for example, correspond with a duration of the input flow of water, with a time of day during which the input flow of water occurs, with a max flow rate or max volume of flow, or the like. In general, the limits 912 and/or 914 may exclude certain types of input flows of water from being analyzed further. Indeed, in some embodiments, a manager of the appliances (or residential, commercial, or industrial setting in which the appliances are disposed) may not be concerned with water flows having a parameter (e.g., max flow volume) that does not exceed the aforementioned learned and/or installed limits 912, 914. The manager may not be concerned regarding water flows having parameters under the aforementioned limits 912 and/or 914 because, for example, any hypothetical leak corresponding with said water flows would not cause damage, would cause negligent or marginal damage, or are otherwise not a concern.

The process 900 includes, as suggested above, determining (block 916) whether the actual flow pattern (or parameter thereof) of the actual input flow of water exceeds the prescribed limit(s) 912 and/or 914. If the actual flow pattern (or parameter thereof) does not exceed the prescribed limit(s) 912 and/or 914, a next iteration (block 918) of the process 900 begins (e.g., via activating the system [block 902], acquiring another iteration of the water flow [block 904], and determining the actual flow parameters [block 906] of the new iteration of the water flow).

If the actual flow parameter does exceed the prescribed limit(s) 912 and/or 914, two things may occur. First, the actual input flow of water (i.e., the actual flow pattern) may be compared with reference flow patterns/signatures 922 and/or 924 to determine whether the actual input flow of water is expected (e.g., corresponds with a flow parameter indicative of use of a single appliance, or of use of multiple appliances simultaneously). As previously described, the reference flow patterns/signatures 922, 924 may correspond with known flow parameters mapped over time for the water demand of a particular appliance or appliances. As shown in the illustrated embodiment, the actual input flow of water (i.e., the actual flow pattern, the actual flow parameters mapped over time) may be compared with learned reference flow patterns 922 and/or with installed reference flow patterns 924. In general, the installed reference flow patterns 924 are manually input by, for example, a manager of the system. The learned reference flow patterns 922, like the aforementioned learned limits 912, are determined by the water loss prevention engine 908 over time. For example, as suggested above with reference to earlier figures, processors of the system (e.g., the water loss prevention engine 908) may include an initialization phase during which the processors (e.g., the water loss prevention engine 908) monitor actual flow parameters to correspond those actual flow parameters with, for example, the use of various combinations of appliances simultaneously. It should be noted that initialization may overlap with operation, meaning the water loss prevention engine 909 may formulate the learned reference flow patterns 922 even during times when the leak detection/mitigation occurs. Accordingly, the water loss prevention engine 908 may learn new reference flow patterns/signatures 922 seasonally, or in response to other changes (e.g., addition of new appliances) that may impact the use of the system. In other words, the water loss prevention engine 908 may operate continuously or periodically to learn new reference flow parameters 922 throughout operation of the flow monitoring systems and the water distribution systems described with reference to earlier figures.

During the comparison of the flow parameters to the limits (block 920), the system determines whether the actual input flow of water matches one of the reference flow patterns 922, 924 (step 926). For example, the system may determine how closely the actual flow pattern matches one of the reference flow patterns 922, 924. If the actual input flow of water does match one of the reference flow patterns 922, 924 (e.g., within a particular threshold, such as a 60% match or higher), the system conducts the next iteration (step 928), namely, by sampling the next acquired actual input flow of water. If the actual input flow of water (i.e., actual flow pattern) does not match one of the reference flow patterns 922, 924, in some embodiments the system may operate to initiate the shut-down mode. However, in the illustrated embodiment, a secondary confirmation may be required (e.g., as indicated at junction 929).

For example, as previously described, two things occur in the illustrated process 900 following the determination, at block 916, that the actual input flow of water exceeds the limits of the system. As previously described, the actual input flow of water is compared with the reference flow patterns/signatures 922, 924. But additionally, the system may await a secondary confirmation to activate the shut-down mode. For secondary confirmation, the actual input flow of water (or parameters thereof) may be compared against a limit margin (block 930). The limit margin may be a percentile of the limit. For example, the limit margin may be 110% of the limit. In other words, at block 930, the system may analyze the actual input flow of water to determine if the parameter(s) of the actual input flow of water exceed the limit(s) 912 and/or 914 by more than 10% (or, in another embodiment, some other limit margin, such as by more than 20%, 30%, etc.). In the illustrated embodiment, if the actual input flow of water (i.e., parameter(s) thereof) does not exceed the limit by more than the prescribed limit margin, the process 900 starts over (e.g., via the next iteration 918 block).

If the actual input flow of water does exceed the limit by more than the prescribed limit margin, a message is sent to the manager (e.g., block 932). The message may be a text message, a phone call, or some other similar message indicating to the manager the specifics of the analysis described above. In the illustrated embodiment, the manager of the system may determine (block 934) whether to bypass the shut-down mode. For example, the manager may be aware of the input flow of water being analyzed, and may determine that shut-down is not necessary. If the user decides to bypass the shut-down mode, the process 900 starts over (block 936). If the user does not enter a bypass instruction, secondary confirmation of the necessity to initialize the shut-down mode is achieved (i.e., at junction 929). Thus, the system may operate to close the shut-down valve (block 938), which stops flow of water to the various appliances of the system.

Figure 10:
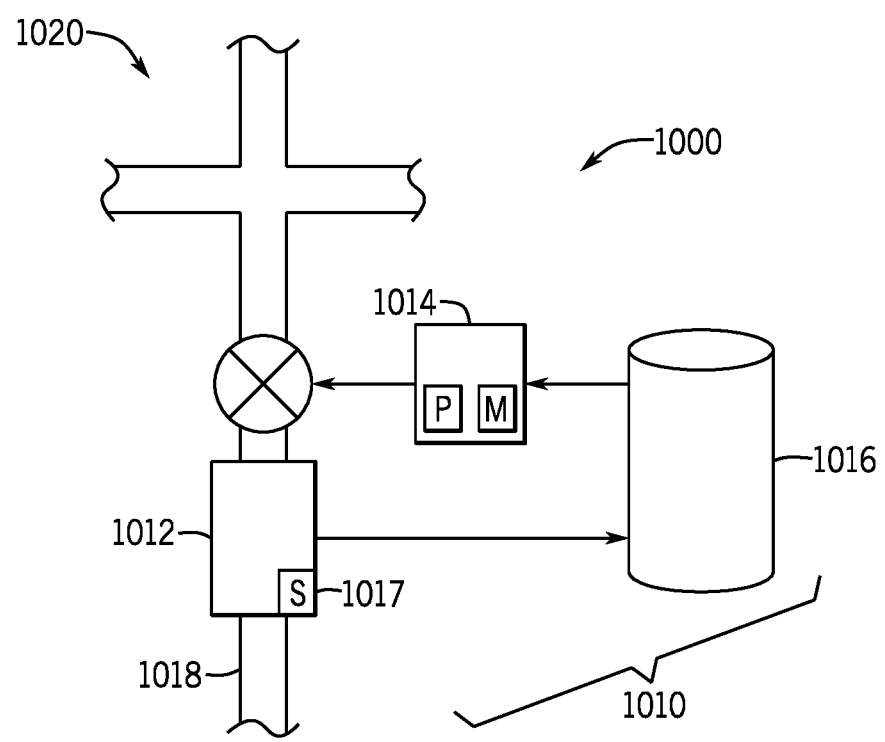
FIG. 10 is an embodiment of a portion of a water flow monitoring system configured to detect and/or mitigate a water leak via, for example, the operation(s) illustrated in FIG. 9, in accordance with an aspect of the present disclosure.

With reference to FIG. 10, a leak detection and mitigation system 1000 that may perform any of the processes described herein may include a local data collector 1012 (e.g., having one or more sensors), a controller 1014 (e.g., local controller), and a coordinator 1016 (e.g., on-site or off-site data analysis componentry). A sensor 1017 of the data collector 1012 may be configured to detect a parameter of a flow of fluid (e.g., through a pipe 1018 of a plumbing system 1020). For example, the sensor 1017 may be a pressure sensor, a temperature sensor, and/or a flow sensor (e.g., flow rate sensor) configured to detect a pressure of the fluid, a temperature of the fluid, a flow rate of the fluid, a flow volume of the fluid, a flow duration of the fluid, or a combination thereof. The sensor 1017 may detect the parameter of the fluid throughout a pre-determined period of time, such as a 24 hour period. The coordinator 1016 of the leak detection and mitigation system 1010 may receive, from the data collector 1012 (e.g., from the sensor 1017 thereof), data indicative of the parameter of the fluid over the pre-determined period of time. After the pre-determined period of time, the coordinator 1016 may analyze the data received from the data collector 1012, and the coordinator 1016 may associate certain received values (e.g., magnitudes) of the parameter with "normal operating events." For example, if a certain value (e.g., magnitude) of the parameter of the fluid is detected multiple times, the coordinator 1016 may designate a first normal operating event. In other words, while the coordinator 1016 may not know that a particular flow rate is associated with flushing of a toilet or a use of a shower, the coordinator 1016 may determine that the particular flow rate is a normal operating event (e.g., based on frequency and/or time of day of the particular flow rate). Normal operating events may include usage of a toilet, a shower, a dishwasher, a clothes washer, a sink, a faucet, etc.

The data collector 1012 may detect the parameter of the fluid in a main segment of pipe 1018 of the plumbing system. In other words, various normal operating events of the plumbing system may cause the fluid to pass through the main segment of the pipe 1018. Further, in some embodiments, multiple normal operating events may occur, and may cause the fluids corresponding with the multiple normal operating events to pass through the main segment of pipe 1018 simultaneously. Accordingly, a flow rate detected by the sensor 1017 of the data collector 1012, for example, may not correspond with a single aforementioned normal operating event, as the flow rate may encompass several normal operating events occurring simultaneously through the main segment of pipe 1018.

However, in accordance with present embodiments, the coordinator 1016 may determine, based on analysis of the data received from the data collector 1012, that the multiple normal operating events are occurring simultaneously. For example, the coordinator 1016 may identify (e.g., establish) a first normal operating event having a first flow rate, and a second normal operating event having a second flow rate that combine to produce the measured flow rate (detected third flow rate). The coordinator 1016 may then compare the established first and second normal operating events (and corresponding first and second flow rates) with a detected third flow rate, where the detected third flow rate does not encompass an established normal operating event. Based on the comparison (e.g., addition, subtraction, etc.) of the first and second flow rates (e.g., of the established first and second normal operating events), the controller 1016 may determine that the third flow rate corresponds with the first and second normal operating events occurring simultaneously (e.g., with some amount of overlap in timeframe).

If the coordinator 1016 determines that a parameter (e.g., flow rate) of the fluid detected by the data collector 1012 does not correspond with a normal operating event or a combination of normal operating events in accordance with the description above, the coordinator 16 may instruct the controller 1014 to block the water supply. For example, the coordinator 1016 may instruct the controller 1014 to close a check valve 1022. Accordingly, any unexpected or undesired leaks from the plumbing system may be blocked. Further, as suggested above, it should be understood that any parameter relating to a flow or a condition of a fluid may be detected and analyzed by the disclosed system 1010 to detect potential leaks, including but not limited to a flow rate, a flow volume, a flow duration, a temperature, or a pressure of the fluid, or any combination thereof.

Figure 11:
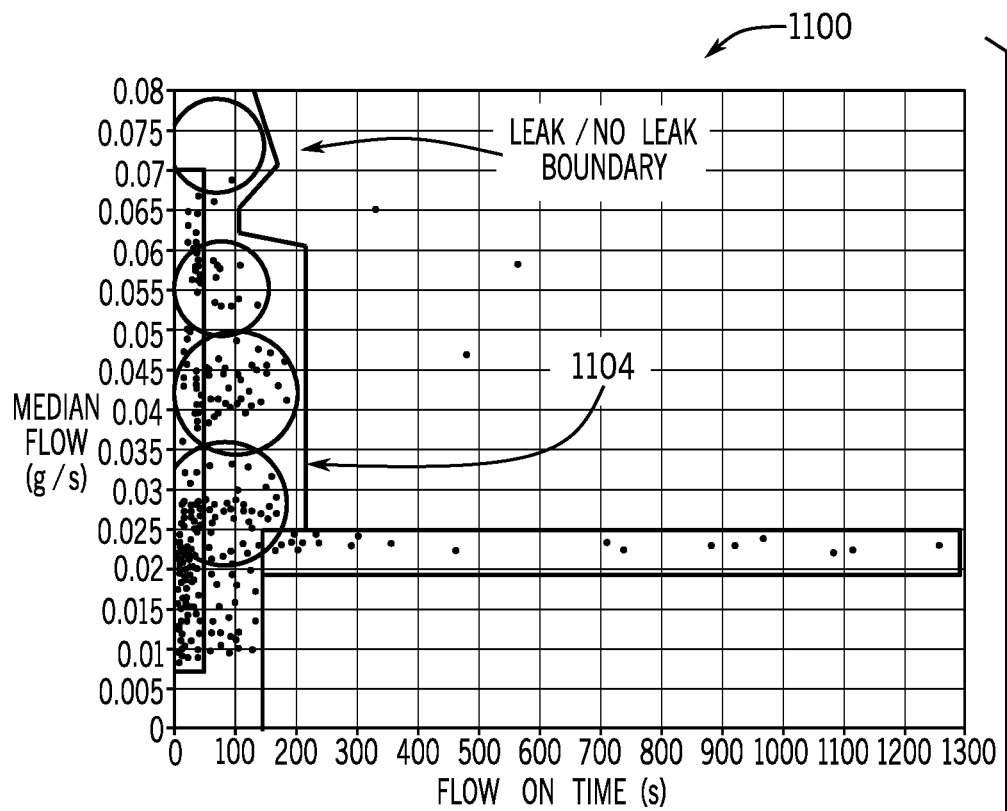
FIG. 11 is an embodiment of a user interface illustrating customizable boundaries utilized for determining a leak via a flow monitoring system, in accordance with an aspect of the present disclosure.
Figure 11:
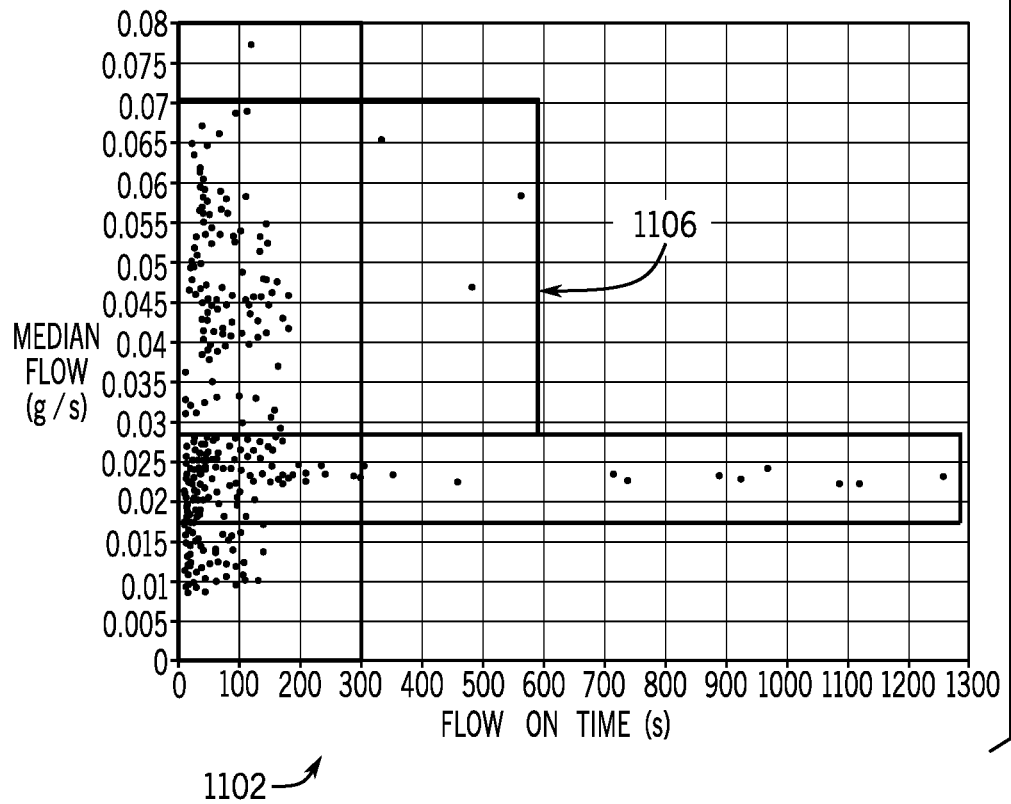

FIGS. 11-13 illustrate various embodiments of user interfaces that display information relating to the above-described flow monitoring systems and methods. In particular, FIG. 11 includes a first plot 1100 and a second plot 1102 representative of customizable boundary conditions 1104, 1106, respectively, utilized for determining a leak. For example, the first plot 1100 is representative of aggressive boundaries 1104 formed about data points indicative of the above-described flow data. In other words, the data points indicative of the above-described flow data are mapped on the plot 1100, and the aggressive boundaries 1104 are formed about clusters of the data points. The aggressive boundaries 1104 are generally formed closer to the clusters, and represent various flow events. Because the aggressive boundaries 1104 are more closely formed to the clusters of data points, and because leak events are detected by failing to match actual flow data with an identified flow event, the aggressive boundaries 1104 are more susceptible to false positives (e.g., with compound flows), but reduce potential water loss.

On the other hand, the second plot 1102 is representative of relaxed boundaries 1106 formed about data points indicative of the above-described flow data. In other words, the data points indicative of the above-described flow data are mapped on the second plot 1102, and the relaxed boundaries 1106 are formed about clusters of the data points. The relaxed boundaries 1106 are generally formed further from the clusters (e.g., compared to the aggressive boundaries 1104 of the first plot 1100), and represent various flow events. Because the relaxed boundaries 1104 are formed further from the clusters of data points, and because leak events are detected by not matching actual flow data with an identified flow event, the relaxed boundaries 1104 are more less susceptible to false positives (e.g., with compound flows), but may allow more water to leak.

It should be noted that a user (e.g., home owner) of the flow monitoring system may customize the boundaries of the learning component (e.g., the water loss prevention engine 908 of FIG. 9) in accordance with the user's needs or desires. As described above, enabling more aggressive boundaries 1104 may cause the flow monitoring system to more frequently detect false positives, but may more frequently detect an actual leak. On the other hand, more relaxed boundaries 1106 may cause the flow monitoring system to less frequently detect false positives, but less frequently detect an actual leak. It should be noted that geometric fitting algorithms may be used to generate the aggressive and relaxed boundaries 1104, 1106 based on the data and one or more adjustable algorithm parameters (e.g., where the one or more adjustable algorithm parameters may be set by the user). Geometric fitting algorithms may include, for example, a total least squares algorithm, a Deming regression algorithm, or an orthogonal regression algorithm, although other geometric fitting algorithms are also possible.

FIG. 12 illustrates an embodiment of a user interface 1200 having various features of a cloud learning system utilized for determining flow data and classifying flow events. FIG. 13 is an embodiment of a user interface 1300 illustrating identification and clustering of individual flow events to be learned by the cloud learning system of FIG. 12, in accordance with an aspect of the present disclosure While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method of monitoring a flow of water in a water distribution system having a plurality of appliances, the method comprising:
   detecting, via a sensor, flow data of the flow of water toward the plurality of appliances;
   determining, via a processor, whether a reference flow signature of a plurality of reference flow signatures is present in the flow data, wherein the plurality of reference flow signatures correspond to expected flows to one or more appliances of the plurality of appliances, and wherein the reference flow signature corresponds to an expected flow to two or more appliances of the plurality of appliances;
   sending, via the processor and in response at least in part to a determination that the reference flow signature is not present in the flow data, a notification of a leak condition to a computing device;
   receiving, via the processor and from the computing device, a user-bypass instruction; and
   bypassing, via the processor, a shut-down mode in response to receiving the user-bypass instruction.

2. The method of claim 1, comprising:
   first determining whether the flow data exceeds a threshold limit parameter; and
   then when the flow data exceeds the threshold limit parameter, determining whether the reference flow signature of the plurality of reference flow signatures is present in the flow data.

3. The method of claim 2, wherein the threshold limit parameter comprises a duration of flow, a max flow volume, or a max flow rate.

4. The method of claim 1, wherein the flow data comprises a flow rate, a mass flow rate, or a flow flux of the flow of water with respect to time.

5. The method of claim 1, comprising determining, via the processor, that an additional reference flow signature of the plurality of reference flow signatures is not present in the flow data before determining whether the reference flow signature is present in the flow data.

* * * * *